United States Patent
Ruelke et al.

(10) Patent No.: US 8,155,615 B2
(45) Date of Patent: Apr. 10, 2012

(54) GENERATION OF A COMPOSITE MITIGATION SIGNAL WITH A DESIRED SPECTRAL ENERGY DISTRUBUTION

(75) Inventors: Charles R. Ruelke, Margate, FL (US); Geetha B. Nagaraj, Coral Springs, FL (US); Shafiullah Syed, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 827 days.

(21) Appl. No.: 12/264,342

(22) Filed: Nov. 4, 2008

(65) Prior Publication Data

US 2010/0112973 A1  May 6, 2010

(51) Int. Cl.
  *H04B 1/10* (2006.01)
(52) U.S. Cl. .......................... 455/295; 455/326
(58) Field of Classification Search .................. None
  See application file for complete search history.

(56) References Cited

U.S. PATENT DOCUMENTS

| 4,606,019 | A | * | 8/1986 | Takai ........................... 370/321 |
| 6,125,272 | A | | 9/2000 | Bautista |
| 6,810,242 | B2 | | 10/2004 | Molnar |
| 7,251,468 | B2 | * | 7/2007 | Ruelke et al. ................ 455/296 |

* cited by examiner

*Primary Examiner* — Cassandra Cox
(74) *Attorney, Agent, or Firm* — Anthony P. Curtis; Daniel R. Bestor (57) ABSTRACT

A method (1100, 1200) of generating a composite mitigation signal (216, 902, 1002) is presented. The composite mitigation signal includes an odd integer (N) of transitions (310, 312) between a first amplitude and a second amplitude of the composite mitigation signal. Successive sets of the transition bursts are separated by a desired phase delay or time delay (330), or such separations are defined by a base signal (416) having a frequency equal to a fundamental frequency of the composite mitigation signal. The composite signal generators (222, 900, 1000) that generate the composite mitigation signal are also presented.

18 Claims, 8 Drawing Sheets

Generate a multiple transition burst signal comprising a plurality of sets of transition bursts, each set of transition bursts comprising an odd integer (N) of transitions between a first amplitude and a second amplitude of the multiple transition burst signal, N being an integer equal to at least three, and successive sets of the transitions being separated by a desired phase delay or time delay
1102

↓

Output the combination of the base signal and the multiple transition burst signal as the composite mitigation signal
1104

Generating a base signal having a frequency equal to a desired fundamental frequency of a composite mitigation signal
1202

↓

Generate a multiple transition burst signal comprising a plurality of sets of transition bursts, each set of transition bursts comprising an odd integer (N) of transitions between a first amplitude and a second amplitude of the multiple transition burst signal, N being an integer equal to at least three, and a frequency of the multiple transition burst signal being at least three times the fundamental frequency of the a desired composite mitigation signal
1204

↓

Combine the base signal and the multiple transition burst signal
1206

↓

Output the combination of the base signal and the multiple transition burst signal as the composite mitigation signal
1208

FIG. 12

GENERATION OF A COMPOSITE MITIGATION SIGNAL WITH A DESIRED SPECTRAL ENERGY DISTRUBUTION

TECHNICAL FIELD

The present application generally relates to frequency translation circuits and, more particularly, to frequency translation circuits which include dynamically matched mixers.

BACKGROUND

Modern radio frequency (RF) receivers oftentimes include a frequency translation circuit that receives RF signals from a RF front end, translates the RF signals into a lower frequency band, and outputs the lower frequency signals for further processing. For instance, a frequency translation circuit may be implemented to translate RF input signals to intermediate frequency (IF) signals. Frequency translation circuits also may be used in RF transmitters to translate lower frequency signals, such as IF signals, to higher frequency bands, for example to generate RF output signals.

Figure 1:
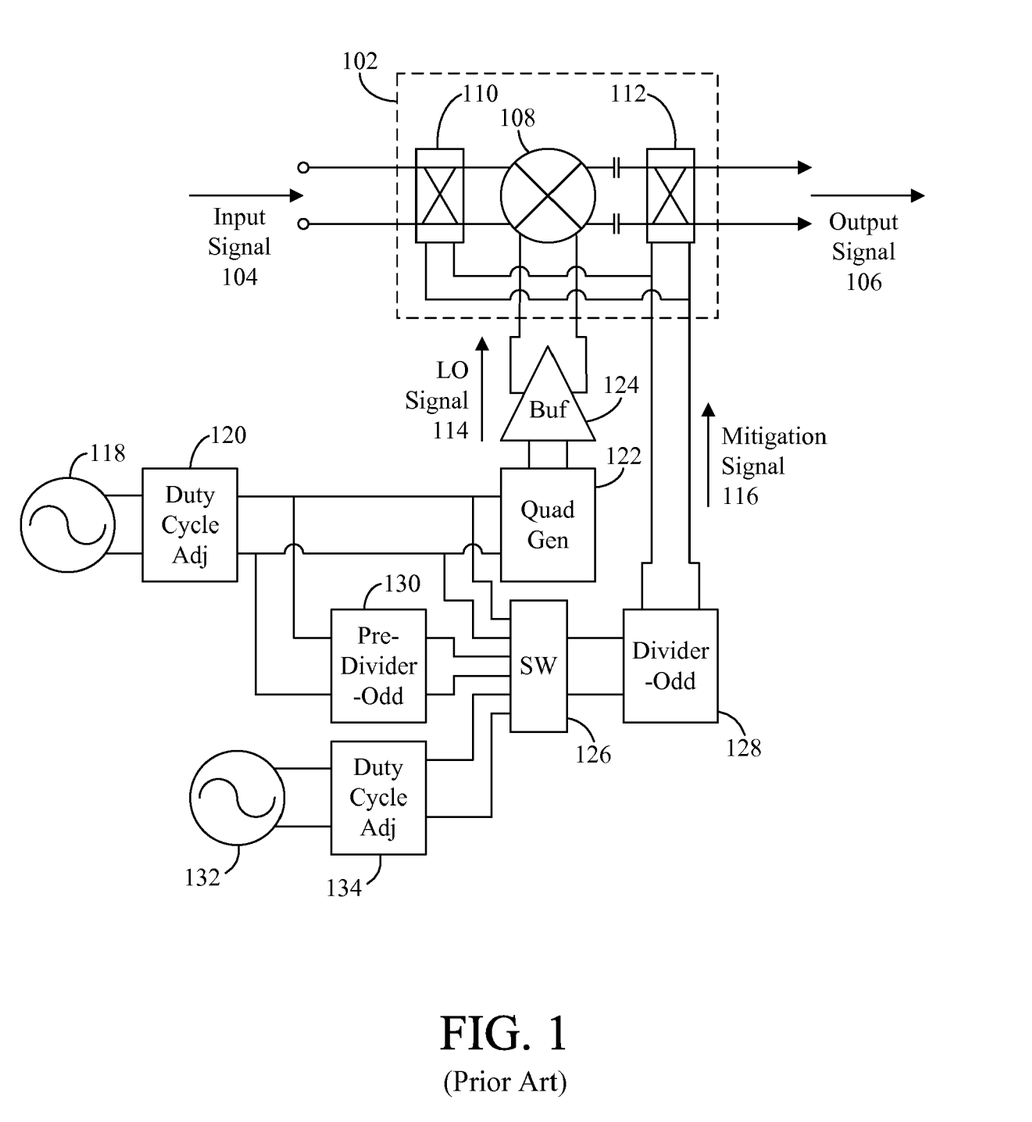
FIG. 1 depicts a prior art frequency translation circuit with associated signal sources.

An example of a frequency translation circuit 100 is depicted in FIG. 1. The frequency translation circuit 100 commonly may include a dynamically matched mixing stage (hereinafter "mixing stage") 102. The mixing stage 102 typically is used to perform frequency translation (e.g. down-conversion or up-conversion) on an input signal 104 to generate an output signal 106. In a common configuration, the mixing stage 102 may include a mixer 108, a dynamic matching network 110 on an input side of the mixer 108, and a dynamic matching network 112 on an output side of the mixer 108.

To perform frequency translation, the mixing stage 102 mixes the input signal 104 with a local oscillator (LO) signal 114. In a common configuration, the LO signal 114 may be generated by a voltage controlled oscillator (VCO) 118 that is coupled to other circuit components, such as a duty cycle adjustment module 120, a quadrature generator 122 and a buffer circuit 124.

A mitigation signal 116 oftentimes is used to drive switching in the dynamic matching networks 110, 112 between in-phase and quadrature phase branches of the mixer 108 in order to reduce spurious frequency interference, or intermodulation distortion, in the output signal 106 caused by non-linearities of the mixer 108. To generate the mitigation signal 116, an appropriate clock signal may be selected with a switch 126 and communicated to a divider 128, which may generate the mitigation signal 116 from an odd-order sub-harmonic of the selected clock signal. The switch 126 can, for example, select the clock signal from the output of the duty cycle adjustment module 120, a pre-divider 130 that generates odd-order sub-harmonics of such signal, or a signal generated by a clock source 132 and corresponding duty cycle adjustment module 134.

While use of the mitigation signal 116 can help to reduce intermodulation distortion caused by the non-linearities of the mixer 108, the mitigation signal 116 itself may introduce additional spurious signals into the frequency translation circuit 100. Specifically, a square wave mitigation signal 116 includes a significant amount of energy at the square wave's fundamental frequency, as well as the odd harmonics of the fundamental frequency. These frequencies oftentimes mix with undesired off-channel spurious signals that couple into the frequency translation circuit 100 and, in consequence, generate additional on-channel spurious signals in the output signal 106.

RF pass-band filters can be used to filter the input signal 104 to attenuate the off-channel spurious signals that would otherwise mix with the mitigation signal 116, thus mitigating their negative effects on the output signal 106. However, if the frequencies of the off-channel spurious signals are close to the desired on-channel frequencies of the input signal 104, the filters necessary to suitably attenuate the off-channel spurious signals without adversely attenuating the input signal 104 become prohibitively expensive and complex due to the very high quality factor (Q) that is required of the filters.

SUMMARY

A method of generating a composite mitigation signal is disclosed. The method can include generating a multiple transition burst signal that includes a plurality of sets of transition bursts. Each set of transition bursts can include an odd integer (N) of transitions between a first amplitude and a second amplitude of the multiple transition burst signal. The integer odd (N) can be equal to at least three. Further, successive sets of the transition bursts can be separated by a desired phase delay or time delay. The multiple transition burst signal can be output as the composite mitigation signal.

Another method can include generating a base signal having a frequency equal to a desired fundamental frequency of the composite mitigation signal. A multiple transition burst signal also can be generated. The multiple transition burst signal can include a plurality of sets of transition bursts. Each set of transition bursts can include an odd integer (N) of transitions between a first amplitude and a second amplitude of the multiple transition burst signal. The odd integer (N) can be equal to at least three, and a frequency of the multiple transition burst signal can be at least three times the fundamental frequency. The base signal and the multiple transition burst signal can be combined, and the combination of the base signal and the multiple transition burst signal can be output as the composite mitigation signal.

A composite mitigation signal generator is also disclosed. The composite mitigation signal generator can include a tap selection network that generates a multiple transition burst signal. The multiple transition burst signal can include a plurality of sets of transition bursts. Each of the sets of transition bursts can include an odd integer (N) of transitions between a first amplitude and a second amplitude of the multiple transition burst signal. N can be an integer equal to at least three, and successive sets of the transitions can be separated by a desired phase delay or time delay.

In another arrangement, the composite mitigation signal generator can include a multiplexer that generates a multiple transition burst signal, which can include a plurality of sets of transition bursts. Each of the sets of transition bursts can include an odd integer (N) of transitions between a first amplitude and a second amplitude of the multiple transition burst signal. N can be an odd integer equal to at least three (3), and successive sets of the transitions can be separated by a desired phase delay or time delay.

This summary is presented to allow the reader to ascertain only some features of the technical disclosure. It is submitted with the understanding that it will not be used to interpret or limit the scope or meaning of the claims.

BRIEF DESCRIPTION OF THE DRAWINGS

Embodiments will be described below in more detail, with reference to the accompanying drawings, in which:

FIG. 11 is a flowchart presenting a method of generating a composite mitigation signal; and FIG. 12 is another flowchart presenting a method of generating a composite mitigation signal.

DETAILED DESCRIPTION

While the specification concludes with claims defining features of the invention that are regarded as novel, it is believed that the invention will be better understood from a consideration of the description in conjunction with the drawings. As required, detailed embodiments are disclosed herein; however, it is to be understood that the disclosed embodiments are merely exemplary, and the invention can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 2:
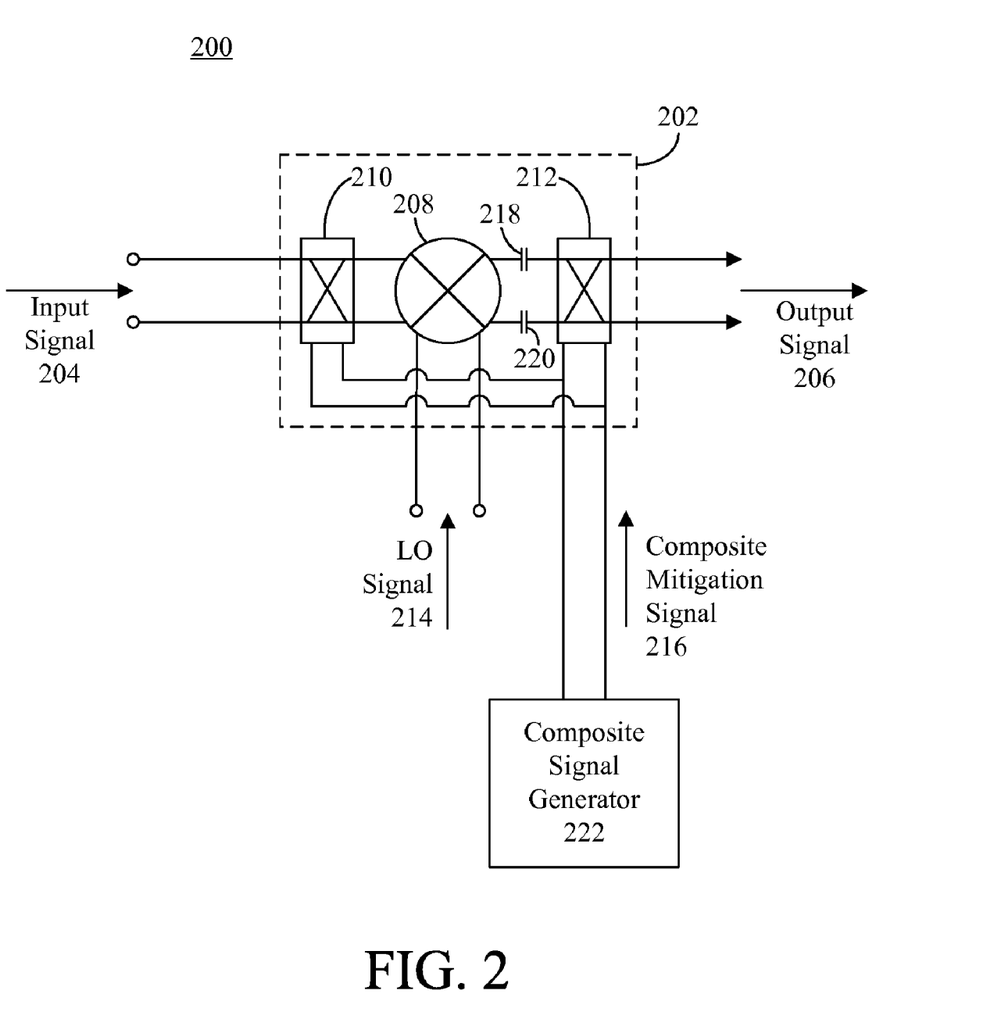
FIG. 2 depicts one embodiment of a frequency translation circuit.

FIG. 2 depicts a frequency translation circuit 200 that is useful for understanding arrangements described herein, which relate to the generation of a composite mitigation signal 216 for a dynamically matched mixing stage (hereinafter "mixing stage") 202. In contrast to a square wave mitigation signal, the composite mitigation signal 216 can be configured to mitigate on-channel spurious signals in an output signal 206 that is generated by the mixing stage 202, thus reducing intermodulation distortion in the output signal 206. In particular, the composite mitigation signal 216 can be configured to contain less signal energy at the fundamental frequency and certain harmonics of the composite mitigation signal 216 in comparison to a typical mitigation signal. Accordingly, on-channel interference caused when these frequencies mix with off-channel spurious signals is significantly reduced.

The mixing stage 202 can be used to perform frequency translation (e.g. down-conversion or up-conversion) on an input signal 204 to generate an output signal 206. In one arrangement, the input signal 204 may comprise one or more RF signals received from a RF receiver front end, which is well known in the art. The mixing stage 202 can down-convert such signals to the output signal 206, which may contain intermediate frequency (IF) signals, very low IF (VLIF) signals, direct conversion receiver base-band signals, or signals at any other desired frequency. In another arrangement, the input signal 204 may comprise one or more baseband signals, IF signals, or signals at any other desired frequency, and the mixing stage 202 can convert such signals to any desired frequency. The mixing stage 202 also can be used to encode or decode the input signal 204.

The mixing stage 202 can include a mixer 208, a dynamic matching network 210 on an input side of the mixer 208, and a dynamic matching network 212 on an output side of the mixer 208. The mixer 208 can receive a local oscillator (LO) signal 214 from a suitable LO signal source and mix the LO signal 214 with the input signal 204. Examples of mixers that may be suitable for use as the mixer 208 include, but are not limited to, a Gilbert cell mixer, a ring diode mixer, a switched field effect transistor (FET) ring mixer, a triple balance image suppression mixer, and a complementary transistor switching mixer. Those skilled in the art will appreciate that the mixing stage 202 also can include other components. For example, capacitors 218, 220 may be provided to couple an output of the mixer 208 to an input of the dynamic matching network 212. Still, any of a myriad of other suitable components may be provided within the mixing stage 202 and the invention is not limited in this regard.

In one example, the mixing stage 202 can be a quadrature mixing stage. In such an arrangement, the mitigation signal 116 may be used to drive switching in the dynamic matching networks 210, 212 between in-phase and quadrature phase branches of a mixer 208 in order to reduce spurious frequency interference, or intermodulation distortion, in the output signal 106 caused by non-linearities of the mixer 208. The output signal 206 may be subsequently processed by parallel in-phase and quadrature phase IF sections, as is well known in the art.

A composite signal generator 222, which will be described herein in greater detail, can be provided to generate the composite mitigation signal 216 and propagate the composite mitigation signal 216 to the mixing stage 202. For example, the composite signal generator 222 can be communicatively linked to the dynamic matching networks 210, 212, either directly or via other suitable components. The composite mitigation signal 216 can be used to drive switching in the dynamic matching networks 210, 212, for example to switch the path of the input signal 204 between in-phase and quadrature-phase branches of the mixer 208.

Figure 3:
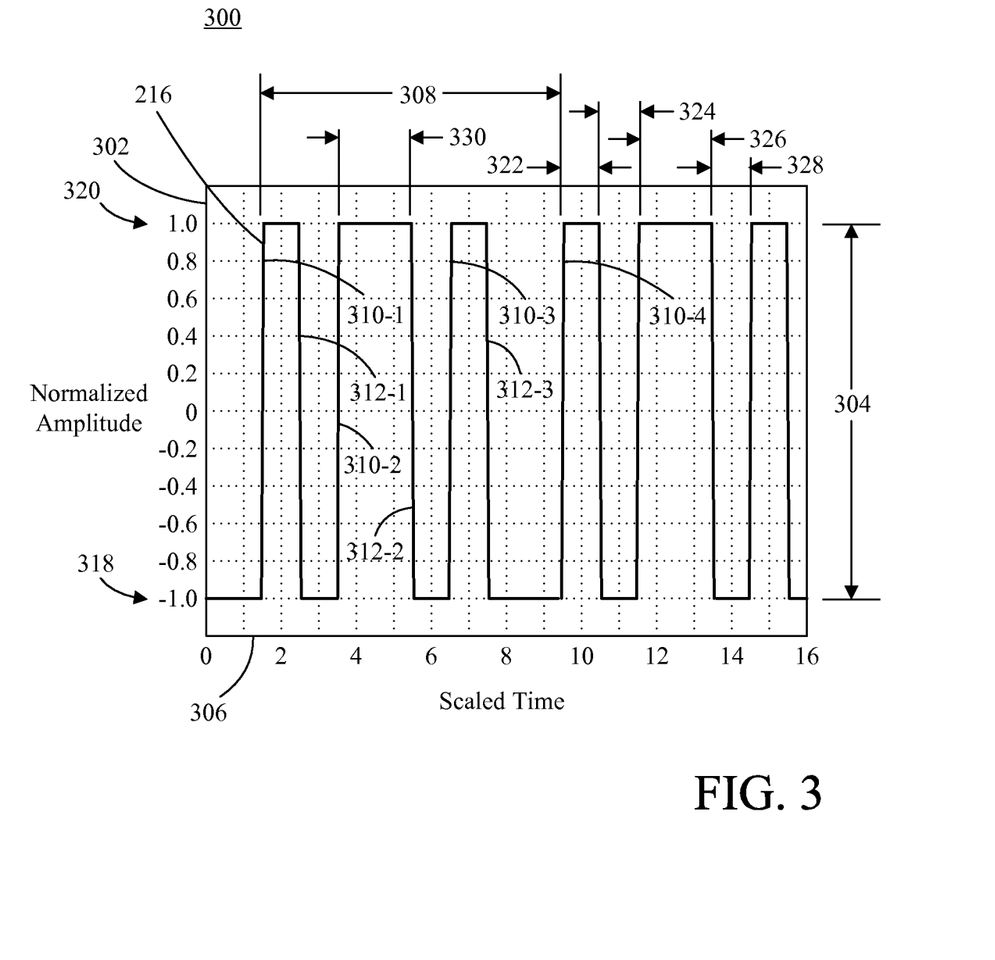
FIG. 3 presents a chart depicting a time-domain representation of an example composite mitigation signal.

An example of the composite mitigation signal 216 is presented in the chart 300 of FIG. 3. The Y-axis 302 of the chart 300 represents a normalized amplitude value 304 for the composite mitigation signal 216, and the X-axis 306 represents time. The time represented by the X-axis 306 may be scaled to correspond to any desired fundamental frequency of the composite mitigation signal 216, which is represented by the period 308 between a transition 310-1 and a transition 310-4 of the composite mitigation signal 216. By way of example, if the desired fundamental frequency of the composite mitigation signal 216 is 40 MHz, each numeric identifier for the X-axis 306 may be multiplied by 3.125 ns.

The composite signal generator can be configured to generate the composite mitigation signal 216 to comprise a set of transition bursts 310-1, 312-1, 310-2, a set of transition bursts 312-2, 310-3, 312-3, and so on, which toggle the composite mitigation signal 216 between a first signal level 318 and a second signal level 320 (e.g. between −1.0 to 1.0, and from 1.0 to −1.0) at selected intervals 322, 324, 326, 328.

The intervals 322-328 can be defined to repeat in any desired order. In the present example, the set of transition bursts comprising transitions 310-1, 312-1, 310-2 and the set of transition bursts comprising transitions 312-2, 310-3, 312-3 are depicted as having a burst frequency that is four times the frequency of the desired fundamental frequency. The invention is not limited in this regard, however, and the ratio of the frequency of the sets of multiple transition bursts 310-1, 312-1, 310-2 and 312-2, 310-3, 312-3 to the frequency of the fundamental frequency can be any ratio greater than 3, and such ratio need not be an integer value.

Moreover, each set of the transition bursts 310-1, 312-1, 310-2 and 312-2, 310-3, 312-3 need not be limited to three transitions, but can be defined to comprise an odd integer (e.g. N=3, 5, 7, 9, 11, 13, 15, 17, 19, 21, 23, . . . ) of alternating transitions 310-312. In this regard, each set of the transition bursts 310-1, 312-1, 310-2 and 312-2, 310-3, 312-3 can be generated by selecting suitable portions of a multiple transition burst signal.

As used herein, a set of transition bursts is a signal comprising an odd integer (N) of half-cycle square wave transitions between a first amplitude (e.g. −1.0) and a second amplitude (e.g. 1.0) where N≧3. The frequency of the transition bursts can be a value (K) times a desired fundamental frequency, where the value (K) may be a real number at least three times the desired fundamental frequency. As such, the value (K) is not limited to integer values. The desired fundamental frequency can be a frequency of a base signal, but this need not be the case.

In one aspect of the inventive arrangements, the composite signal generator can combine a plurality of signals to generate the composite mitigation signal 216. Examples of such signals are presented in the respective charts 400, 500 depicted in FIG. 4 and FIG. 5. The chart 400 of FIG. 4 depicts a time-domain representation of an example base signal 416, and the chart 500 depicts a time-domain representation of an example multiple transition burst signal 516, portions of which may be used to generate the sets of transition bursts.

Figure 4:
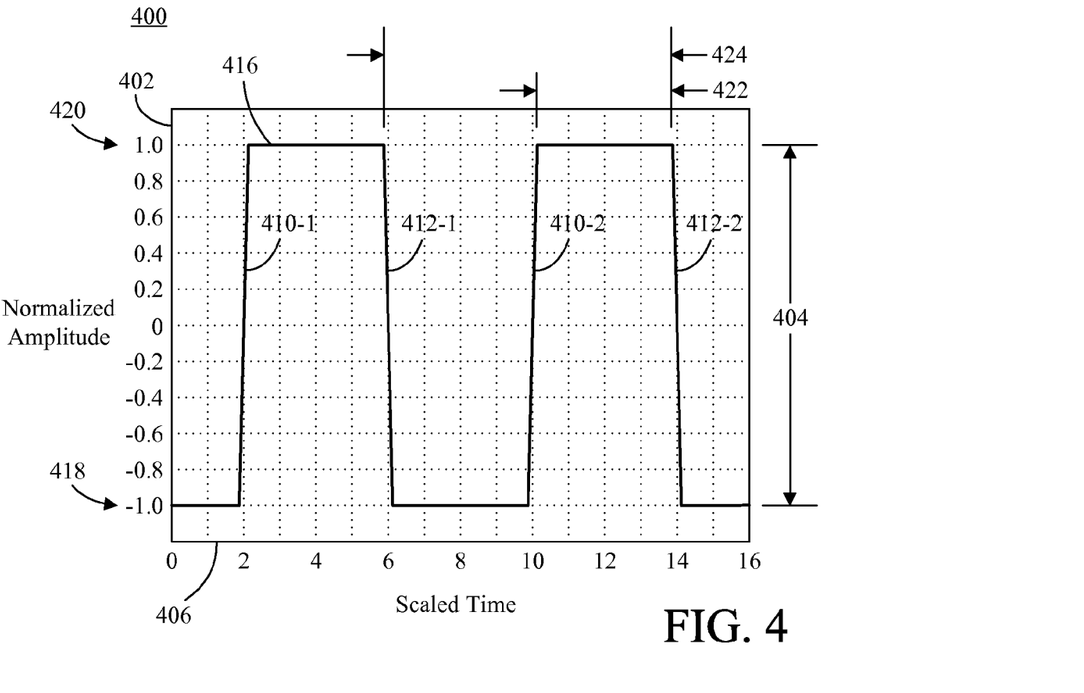
FIG. 4 presents a chart depicting a time-domain representation of a base signal.

Referring to FIG. 4, the normalized amplitude value 404 of the Y-axis 402 can correspond to the normalized amplitude value 304 of FIG. 3. Further, the time instances represented by the X-axis 406 may be scaled to correspond to the time instances represented by the X-axis 306 of FIG. 3.

In one arrangement, the base signal 416 can be a square wave having amplitude 404. A plurality of transitions 410-1, 412-1, 410-2, 412-2, and so on, can be provided to transition the base signal 416 between a first signal level 418 and a second signal level 420 (e.g. from −1.0 to 1.0, and from 1.0 to −1.0). For example, the base signal 416 can be a square wave which is commonly used as a legacy mitigation signal for a dynamically matched mixing stage.

Slew rates of circuit components can prevent instantaneous transitions 410, 412. Accordingly, rise times and fall times may be associated with the base signal 416. Moreover, the base signal 416 may be symmetric, but this need not be the case. For instance, the rise time of the transition 410-1 may be different than the fall time of the transition 412-1, pulse widths 422 within the base signal 416 may vary, periods 424 between signal level transitions 410, 412 may vary, and so on. Also, the duty cycle of the base signal 416 can, but need not, be approximately fifty-percent. That is, the pulse width 422 of the base signal 416 can be approximately one-half of the period 424 of the base signal 416. The pulse width 422 also can be longer or shorter.

Figure 5:
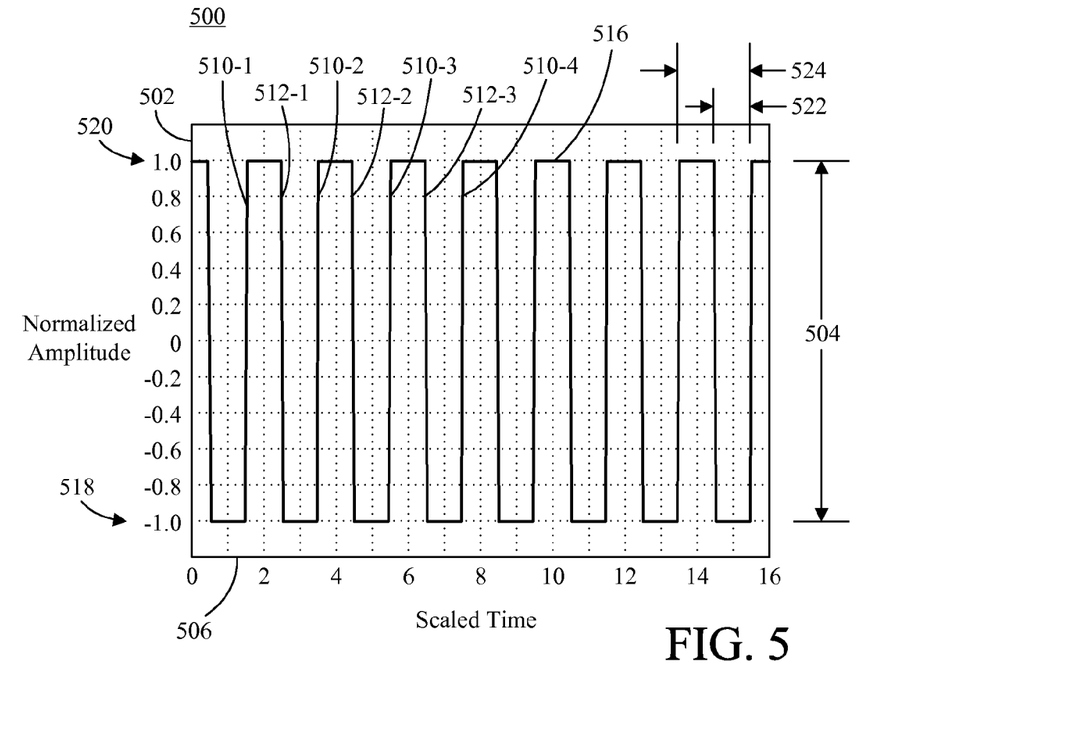
FIG. 5 presents a chart depicting a time-domain representation of a multiple transition burst signal.

Referring to FIG. 5, a normalized amplitude value 504 of the Y-axis 502 can correspond to the normalized amplitude value 304 of FIG. 3, though this need not be the case. For example, the normalized amplitude value 504 may instead be selected to cancel portions of the base signal 416 of FIG. 4, as will be described. Moreover, although the time instances represented by the X-axis 506 may be scaled to correspond to the time instances represented X-axis 306 of FIG. 3, the time instances represented by the X-axis 506 also may be different, as will be described.

The multiple transition burst signal 516 can be a square wave having a plurality of transitions 510, 512, which too may have associated rise times and fall times. The multiple transition burst signal 516 also can be symmetric, though this is not required. A pulse width 522 of the multiple transition burst signal 516 can be approximately one-half of the period 524 of the multiple transition burst signal 516, or can be longer or shorter. Further, the period 524 of the multiple transition burst signal 516 can be one-third the period 424 of the base signal 416 of FIG. 4, or shorter. In other words, the multiple transition burst signal 516 can be selected to have a frequency at least three times that of the frequency of the base signal 416.

In one arrangement, the amplitude value 504 and signal levels 518, 520 of the multiple transition burst signal 516 can be selected so as to add to and/or cancel one or more portions of the base signal 416 of FIG. 4 at or near the transitions 410, 412, and the multiple transition burst signal 516 can be selectively applied to the base signal 416 in order to generate the composite mitigation signal.

For example, the multiple transition burst signal 516 can be selectively applied to insert the transitions 512-1, 510-2 into the base signal 416 at a desired time following the transition 410-1 and following the transition 410-2. In this regard, the transitions 410-1, 512-1, 510-2 can represent a set of transition bursts, and the transitions 410-2, 512-1, 510-2 can represent another set of transition bursts.

Similarly, the transitions 510-3, 512-3 can be inserted into the base signal 416 at a desired time following the transition 412-1 and following the transition 412-2, and the respective sets of transitions can represent sets of transition bursts. In another example, the multiple transition burst signal 516 can be selectively applied to insert the transitions 510-1, 512-1 into the base signal 416 at a desired time prior to the transition 410-1 and the transition 410-2, and the transitions 512-3, 510-4 can be inserted into the base signal 416 at a desired time prior the transition 412-1 and the transition 412-2.

In also should be noted that the polarity of the multiple transition burst signal can be selective reversed when being applied to the base signal 416. For instance, the transitions 512-3, 510-4 can be inserted into the base signal 416 at a desired time after the transitions 412-1 and 412-2, but in reverse polarity. Similarly, the transitions 510-3, 512-3 can be selectively inserted into the base signal 416 in reverse polarity at a desired after the transitions 410-1 and 410-2.

In another example, a set of N transitions 510-1, 512-1, 510-2 can be applied in the base signal 416 as transition bursts. The transition bursts can be applied at a selected time in lieu of the transitions 410-1, and again in lieu of transition 410-2. Similarly, a set if N transitions 512-2, 510-3, 512-3 can be applied as transition bursts in the base signal 416 at a selected time in lieu of the transition 412-1, and again in lieu of transition 412-2. Alternatively, a set if N transitions 510-3, 512-3, 510-4 can be applied as transition bursts in the base signal 416 at a selected time in reverse polarity in lieu of the transition 412-1, and again in lieu of transition 412-2. In this regard, the transition bursts (e.g. bursts of sets of N transitions 510, 512) can be applied to be effectively synchronous with the transitions 410, 412. As noted, N is an odd integer.

The phase of the multiple transition burst signal 516 with respect to the base signal 416 need not be set to a particular value. For instance, if the set of transition bursts 510-1, 512-1, 510-2 are associated with the transition 410-1 of the base signal 416, the phase of the multiple transition burst signal 516 can be adjusted so that the transition 510-1 occurs before, after, or synchronous with the transition 410-1. If the set of transition bursts 510-3, 512-3, 510-4 are associated with the transition 412-1 (e.g. applied in the base signal 416 with reverse polarity), the phase of the transition 510-3 can be adjusted such that the transition 510-3 occurs before, after, or synchronous with the transition 412-1.

Continuing with the latter example, the phase difference between the transition 510-1 and the transition 410-1 can correspond to the phase difference between the transition 510-3 and the transition 412-1. Accordingly, the fundamental frequency of the composite mitigation signal generated by applying the multiple transition burst signal in the base signal 416 can be maintained to be approximately equal to the base signal's fundamental frequency. In another arrangement, the phase between the transition 510-3 and the transition 412-1 can be different from the phase between the transition 510-1 and the transition 410-1, in which case the spectral energy distribution of the composite mitigation signal may differ from the examples presented herein.

In another example, the composite mitigation signal can be generated exclusively from the multiple transition burst signal 516. For instance, briefly referring to FIG. 3 and FIG. 5, a phase delay (or time delay) 330 (shown in FIG. 3) can be defined so as to be strategically applied to a continuous stream of the multiple transition burst signal 516 between successive sets of transition bursts 510-1, 512-1, 510-2 and 512-2, 510-3, 512-3 (or 510-3, 512-3, 510-4 applied in reverse polarity) so as to provide a desired separation between successive transition sets. In such an arrangement, the phase delay or time delay 330 can be selected to match any desired fundamental frequency wherein the fundamental frequency is lower than the frequency of the multiple transition burst signal 516 by a factor K, where K may be a real number equal to or greater than 3.

Notwithstanding these examples, the composite mitigation signal can be generated in any other suitable manner and the invention is not limited in this regard. For example, a suitable algorithm can be defined to generate the composite mitigation signal, for instance by defining when the sets of transitions 510-1, 512-1, 510-2 and 512-2, 510-3, 512-3 (or 510-3, 512-3, 510-4 applied in reverse polarity) are to occur.

Figure 6:
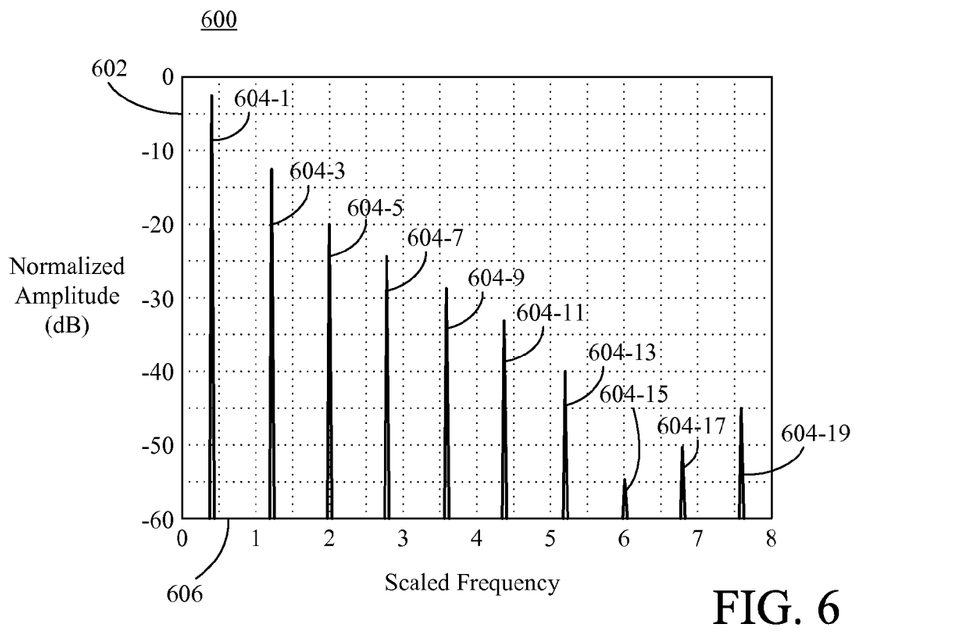
FIG. 6 presents a chart depicting a frequency-domain representation of the example base signal of FIG. 4.

In FIG. 6, a frequency-domain representation of the example base signal 416 of FIG. 4 is presented. The Y-axis 602 of the chart 600 represents normalized amplitude values for the Fourier series coefficients of the base signal 416, in decibels (dB), where 0 dB represents the total power of the base signal 416. The X-axis 606 of the chart 600 represents frequency. The frequencies represented by the X-axis 606 may be scaled to correspond to any desired fundamental frequency of the base signal 416. For example, if the fundamental frequency 604-1 of the base signal 416 is 40 MHz, each numeric identifier for the X-axis 606 may be multiplied by 100 MHz.

The spectral energy of the example base signal 416 may be distributed among the fundamental frequency 604-1, and each of the odd harmonics 604-3, 604-5, 604-7, 604-9, 604-11, 604-13, 604-15, 604-17, 604-19 of the fundamental frequency 604-1. If a square wave, such as the base signal 416, were to be used as a mitigation signal, energy contained at the various frequencies 604-1-604-19 could cause unwanted spurious signals in the output signal 206 of FIG. 2, as previously noted. Since the fundamental frequency 604-1 and the lower order harmonics 604-3-604-9 generally contain the greatest portions of the spectral energy, these frequencies 604-1-604-9 could be the most problematic in causing undesired spurious responses within a communication system, such as those that cause undesired spurious responses (e.g inter-modulation distortion) in a receiver, especially if these frequencies mix with off-channel spurious signals to produce on-channel spurious signals.

In these arrangements, use of the multiple transition burst signal 516 (FIG. 5) to replace the transitions 410, 412 of the base signal 416 (FIG. 4) with transition bursts, thereby generating the composite mitigation signal 216 (FIG. 3), can reduce the amount of signal energy at the base signal's fundamental frequency 604-1. The base signal's fundamental frequency 604-1 typically contains the greatest amount of signal energy. When mixed with off-channel spurious signals that are close in frequency to desired input signals, the fundamental frequency 604-1 is likely to contribute significantly to undesired on-channel spurious signals. Thus, reducing the signal energy at the fundamental frequency 604-1 can mitigate generation of on-channel spurious signals.

Figure 7:
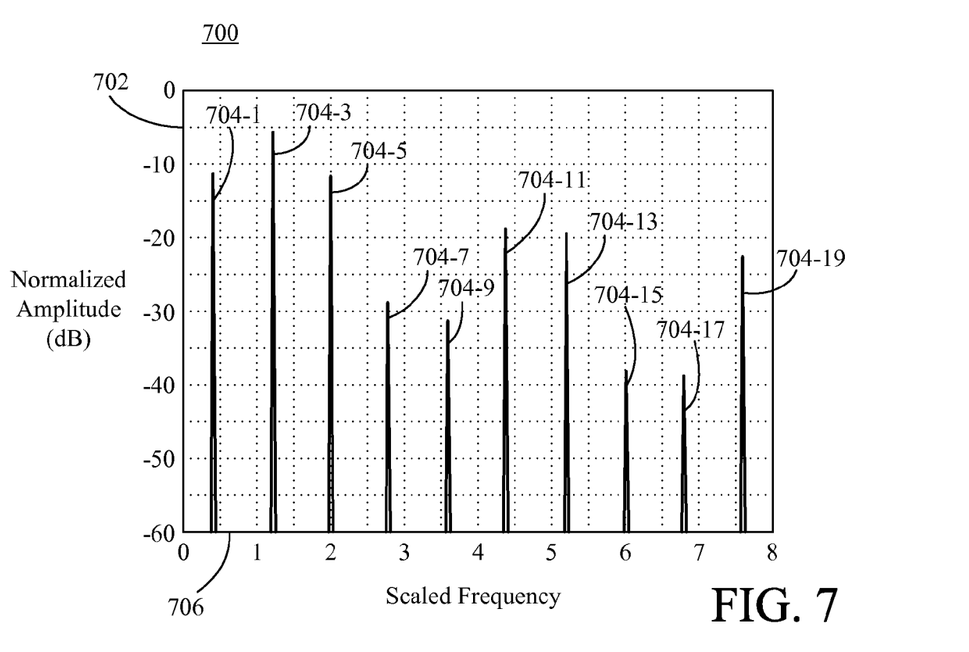
FIG. 7 presents a chart depicting a frequency-domain representation of the example composite mitigation signal of FIG. 3.

For further understanding, a comparison can be made between the amplitude of the fundamental frequency 604-1 in the chart 600 to the fundamental frequency 704-1 in the chart 700 of FIG. 7, which depicts a frequency-domain representation of the example composite mitigation signal 216 of FIG. 3.

In FIG. 7, the axes 702, 706 correspond to the respective axes 602, 606 of the chart 600 (FIG. 6). In particular, the spectral energy in the fundamental frequency 604-1 can be redistributed to other harmonics 604-3-604-19. For example, the amount of energy contained at the fundamental frequency 604-1 can be reduced to a level represented by the fundamental frequency 704-1 depicted in the chart 700, while the amount of energy contained at the other harmonics 604-3-604-19 also may change, as can be seen by comparing the harmonics 604-3-604-19 represented in the chart 600 to corresponding harmonics 704-3, 704-5, 704-7, 704-9, 704-11, 704-13, 704-15, 704-17, 704-19 represented in the chart 700.

Accordingly, use of the multiple transition burst signal to generate a composite mitigation signal as described herein can prevent an increase in spectral noise which could effectively degrade the signal-to-noise ratio (SNR) of a frequency translation circuit that uses a conventional mitigation signal. Further, maintaining synchronicity in relative time between each set of respective N transition bursts 510, 512 (FIG. 5) can minimize the generation of spurious signals not harmonically related to the fundamental frequency of the base signal 416 (FIG. 4) and its associated harmonics.

Figure 8:
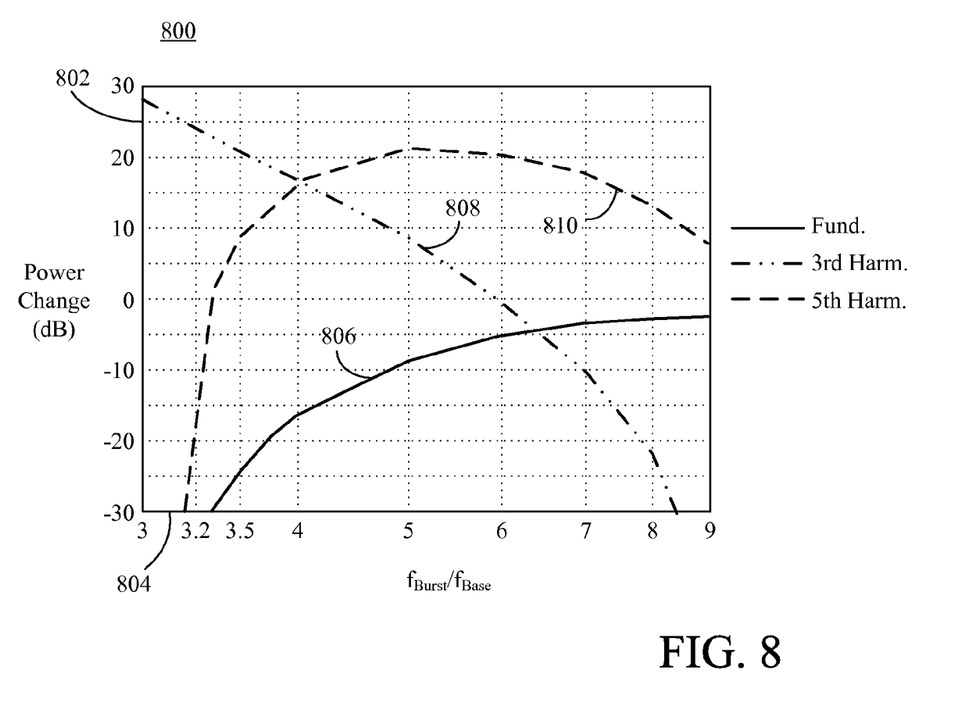
FIG. 8 presents a chart depicting changes in spectral energy distribution.

FIG. 8 presents a chart 800 that depicts changes to the spectral energy distribution that can be achieved by implementing a composite mitigation signal in accordance with the inventive arrangements described herein. The changes depicted are based on various ratios of the fundamental frequency of the multiple transition burst signal 516 (FIG. 5) to the fundamental frequency of the base signal 416 (FIG. 4). In the chart 800, the Y-axis 802 represents such changes as changes in spectral energy, represented in dB, and the X-axis 804 represents various ratios of the fundamental frequency of the multiple transition burst signal 516 with respect to the fundamental frequency of the base signal 416.

More particularly, the plot 806 reflects changes in the energy of the base signal 416 (FIG. 4) at the base signal's fundamental frequency of 604-1 (FIG. 6) for the various ratios represented by the X-axis 804. Similarly, the plot 808 reflects changes in the energy of the base signal 416 at the base signal's third harmonic 604-3 for the various ratios depicted, and the plot 810 reflects changes in the energy of the base signal 416 at the base signal's fifth harmonic 604-5 for the various ratios. Accordingly, the chart 800 may be used to estimate a suitable frequency for the multiple transition burst signal 516 (FIG. 5) relative to the fundamental frequency of the base signal 416 (FIG. 4), depending on the desired spectral energy distribution. In this particular example, the energy at the fundamental frequency 604-1 of the base signal 416 may be reduced significantly by choosing a ratio greater than 3, although the power at one or more of the harmonics 604-3-604-5 may be increased.

Figure 9:
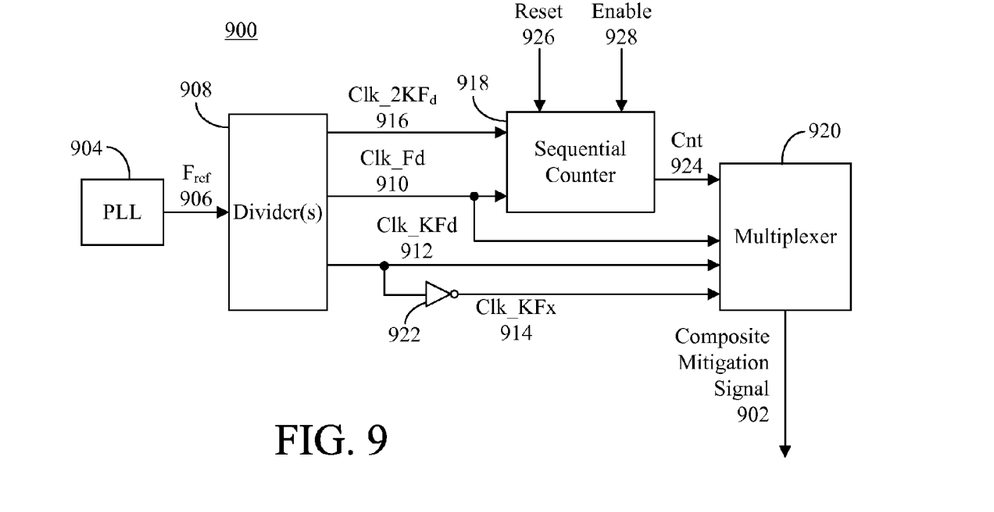
FIG. 9 depicts an example of a composite signal generator.

FIG. 9 depicts an example of a composite signal generator 900 that may be implemented to generate a composite mitigation signal 902 in accordance with arrangements described herein. The composite signal generator 900 can include a phased locked loop (PLL) 904 that generates a frequency reference signal 906 and communicates the frequency reference signal 906 to one or more dividers, for example to a divider 908.

The divider 908 can be configured to generate and output a plurality of clock signals 910, 912, 914, 916 from the frequency reference signal 906. For example, the divider 908 can generate a clock signal 910 (e.g. a base signal) at the desired fundamental frequency of the composite mitigation signal 902, and communicate the clock signal 910 to a sequential counter 918 and a multiplexer 920.

Further, the divider 908 can generate a clock signal 912 (e.g. a multiple transition burst signal) at a frequency that is a number (K)×the fundamental frequency of the clock signal 910 and communicate the clock signal 912 to the multiplexer 920. As noted, the number (K) need not be an integer value, but instead can be any real value (integer or non-integer) equal to or greater than 3. Moreover, the frequency of the clock signal 912 can be selected to shift energy at the desired fundamental frequency (e.g. the frequency of the clock signal 910) to at least one harmonic of the desired fundamental frequency.

A complementary clock signal 914 can be generated from the clock signal 912 using an inverter 922, and communicated to the multiplexer 920. The clock signal 914 can have the same frequency as the clock signal 912, but can be 180° out of phase with respect to the clock signal 912. Accordingly, the clock signal 912 can be used when it is desired to apply the multiple transition in reverse polarity. In addition, the divider 908 can generate a clock signal 916 at a frequency equal to or greater than 2×K×Clk_Fd (e.g. 2×K×the fundamental frequency of the clock signal 910) and communicate the clock signal 916 to the sequential counter 918.

The sequential counter 918 can process the clock signals 910, 916 to generate a counter signal 924 that is communicated to the multiplexer 920 to control a switch state of the multiplexer 920, thus indicating to the multiplexer 920 when to switch between the clock signal 910, the clock signal 912 and the clock signal 914 for use as an input signal. Accordingly, the multiplexer 920 can strategically combine, or multiplex, the clock signals 910, 912, 914 to generate the composite mitigation signal 902.

Moreover, successive sets of the clock signals 912, 914 can be separated by a desired phase delay or time delay, which may be defined by the clock signal 910. For example, a first set of burst transitions defined by the clock signal 912 can be followed by a second set of burst transitions defined by the clock signal 914, and the clock signal 910 can define the period between the first and second sets of burst transitions. Similarly, the clock signal 910 can define when a third set of burst transitions defined by the clock signal 912 is to occur following the second set of burst transitions, and so on.

Hence, the multiplexer 920 can act as a switch that selects the clock signal 910, which may be considered the base signal, the clock signal 912, which may be considered a positive polarity multiple transition burst signal, or the clock signal 914, which may be considered a negative polarity multiple transition burst signal. The selection of the respective clock signals 910, 912, 914 can be based on a recursive sequence of counter values. A counter increment can occur for each transition of the clock signal 916, and each recursive iteration of counter values may be iteratively associated with the base signal 910, the positive polarity multiple transition burst 912, or the negative polarity multiple transition burst signal 914.

Since the frequency of the clock signal 916 may be two times the frequency of the clock signal 912, it also may be at least six times the frequency of the clock signal 910. Thus, every burst of three transitions of the clock signal 912 can correspond to at least six transitions of the clock signal 916, and each period of the clock signal 910 can correspond to 2×N×2 transitions of the clock signal 916, where N is an integer value equal to or greater than 3.

By way of example, if the clock signal 912 provides a positive polarity three transition burst, the sequence counter 918 can output the counter signal 924 to indicate to the multiplexer 920 to select the clock signal 912 for a first duration corresponding to six transitions of the clock signal 916. For instance, the composite mitigation signal 902 output by the multiplexer 920 can transition from 0 to 1, then from 1 to 0, and then again from 0 to 1. The multiplexer 920 then can select the clock signal 910 for a second duration corresponding to one-half of (2×N×2)−(2×6) transitions of the clock signal 916. For instance, the amplitude of the composite mitigation signal 902 can be maintained at 1 for the second duration. Next, the counter signal 924 can indicate to the multiplexer 920 to select the clock signal 914 for a third duration that again corresponds to six transitions of the clock signal 916, thereby producing a negative polarity three transition burst. For example, the composite mitigation signal 902 can transition from 1 to 0, then from 0 to 1, and then again from 1 to 0. The multiplexer 920 then can select the clock signal 910 for a fourth duration corresponding to one-half of (2×N×2)−(2×6) transitions of the clock signal 916, for instance to maintain the composite mitigation signal 902 at 0 for the fourth duration. The process can be repeated continuously while the composite mitigation signal 902 is desired.

Although this example illustrates the use of three transitions of the clock signal 912 (e.g. transition bursts) for each transition of the clock signal 910 (e.g. the base signal), it will be appreciated that any odd number of transitions of the clock signal 912 can be associated with each transition of the clock signal 910. Adjustments to the sequential counter 918 may be desired, however, to adjust for the duty cycle of the clock signal 910 and/or the number of burst transitions (3, 5, 7, etc.) in each group of transition bursts included in the composite mitigation signal 902.

A reset signal 926 can be an input into the sequential counter 918 to insure that the sequential counter 918 begins with a predetermined initial condition. Further, an enable signal 928 can be an input into the sequence counter 918 to selectively enable and disable operation of the sequential counter 918. For example, the enable signal 928 can enable operation of the sequential counter 918 when the composite signal generator 900 is to be activated, and disable such operation when the composite signal generator 900 is to be deactivated.

Figure 10:
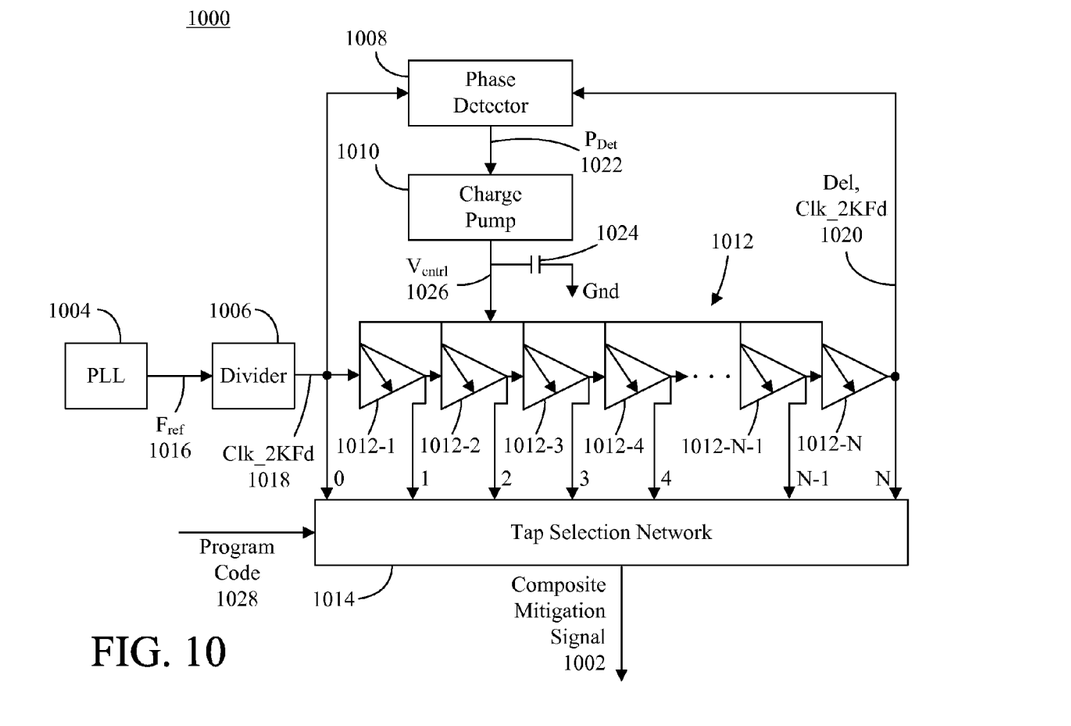
FIG. 10 depicts another example of a composite signal generator.

FIG. 10 depicts another example of a composite signal generator 1000 that may be implemented as a delay line loop (DLL) to generate the composite mitigation signal 1002. In such arrangement, the composite signal generator 1000 can include a phased locked loop (PLL) 1004 and, optionally, a divider 1006. The composite signal generator 1000 also can include a phase detector 1008, a charge pump 1010, a plurality of delay elements (e.g. buffers) 1012-1, 1012-2, 1012-3, 1012-4, 1012-N-1, 1012-N, and a tap selection network 1014. Collectively, the delay elements 1012-1-1012-N may form a delay line 1012.

In operation, the PLL 1004 can generate a frequency reference signal 1016 and communicate the frequency reference signal 1016 to the divider 1006. The divider 1006 can process the frequency reference signal 1016 to generate a reference clock signal 1018 at a sufficiently high frequency to allow generation of the composite mitigation signal 1002. For example, a frequency of the reference clock signal 1018 can be set to at least 2×K×a desired fundamental frequency of the composite mitigation signal, where K is a real value equal to or greater than 3. The reference clock signal 1018 can define the frequency of the multiple transition burst signal defined within the composite mitigation signal 1002.

The clock signal 1018 may be communicated to the phase detector 1008 and to the delay element 1012-1. The delay element 1012-1 can buffer the clock signal 1018 by a desired phase or time, and communicate the clock signal 1018 to the next delay element 1012-2. The delay element 1012-2 can again buffer the clock signal 1018 by the desired phase or time, and communicate the clock signal 1018 to the next delay element 1012-3. This process can continue until the clock signal 1018 has been communicated to the delay element 1012-N.

The delay line 1012 can generate a plurality of time delayed versions of the reference clock signal 1018. The number of delay elements 1012-1-1012-N can be selected based on the resolution desired for generating the transitions that may be needed to create a composite mitigation signal 1002. The composite mitigation signal can be generated from the plurality of transitions in the delayed clock output signals at nodes 0 thru N of tap selection network 1014.

The phase detector 1008 then can receive the reference clock signal 1018 and the delayed clock signal 1020 from the delay element 1012-N, and produce a phase detection signal 1022 that represents a phase difference between the clock signal 1018 and the delayed clock signal 1020. The phase detector 1008 can communicate the phase detection signal 1022 to the charge pump 1010, which can process the phase detection signal 1022 to generate a voltage control signal 1026 that is communicated to each of the delay elements 1012-1 through 1012-N.

The time delay of each of the delay elements 1012-1 through 1012-N may be controlled by the voltage control signal 1026. For example, the phase detector 1008 and charge pump 1010 can be used to progressively adjust the phase lock of the delay among the delay elements 1012-1 through 1012-N in tandem so that the phase difference between the input clock signal 1018 and the delayed clock signal 1020 is separated by one or more time periods of the reference clock signal 1018.

If the cumulative time delay between each of the successive signals 0 through N produces a phase difference between reference 1018 and delayed clocked 1020 that is less than one or more time periods of the fundamental frequency for reference clock signal 1018, then the phase detector 1008 can adjust the phase detection signal 1022 to indicate to the charge pump 1010 to sink current from a capacitor 1024, thereby decreasing the voltage control signal 1026. This in turn can increase the time delay of each element of the delay line 1012. If, however, the time delay between the signals 0 through N produces a phase difference between reference clock signal 1018 and the delayed clock signal 1020 that is greater than one or more time periods of the fundamental frequency for reference clock signal 1018, then the phase detector 1008 can change the phase detection signal 1022. In particular, the phase detection signal 1022 can be changed to indicate to the charge pump 1010 to source current to the capacitor 1024 in order to increase the voltage control signal 1026, which in turn can decrease the time delay of each element of the delay line 1012.

In this manner, the composite mitigation signal 1002 can be generated by iteratively selecting an appropriate delayed output signal 0-N from an appropriate delay element 1012-1-1012-N relative in time to the reference clock signal 1018. From the plurality of delay element output signals 0 through N, there can exist a transition that corresponds to any given transition within the composite mitigation signal 1002. Each transition at the output of delay line 1012 can correspond to a successive transition in the composite mitigation signal 1002, each of which may be sequentially selected and linked together in time to create transition bursts for the composite mitigation signal 1002.

Selecting the correct delay element output 0-N that corresponds to a given transition of composite mitigation signal 1002 can be a function of the tap selection network 1014, which can output the signals 0-N of the delay elements 1012-1-1012-N. Operation of the tap selection network 1014 can be based on suitable program code 1028 processed by the tap selection network 1014. The program code 1028 can identify a particular order of specific delay element output signals among the signals 0-N that, when taken in sequence relative to the reference clock frequency 1018, can generate the corresponding transitions for correct piece-wise construction of the composite mitigation signal 1002.

FIG. 11 is a flowchart presenting a method 1100 of generating a composite mitigation signal. At step 1102, a multiple transition burst signal can be generated. The multiple transmission burst signal can comprise a plurality of sets of transition bursts. Each set of transition bursts comprise an odd integer (N) of transitions between a first amplitude and a second amplitude of the multiple transition burst signal. The odd integer (N) can be equal to, or greater than, three (3). Successive sets of the transitions can be separated by a desired phase delay or time delay.

The frequency of the multiple transition burst signal can be defined to be at least a number (K) times a frequency of a desired fundamental frequency of the composite mitigation signal. Further, the number (K) can be a real value equal to at least three (3). The real number (K) need not be an integer. In other words, the frequency of the multiple transition burst signal can be at least three times the desired fundamental frequency. The frequency of the multiple transition burst signal also can be defined to shift energy at the desired fundamental frequency to at least one harmonic of the desired fundamental frequency. In addition, a phase delay or time delay can be defined to be applied after each of the sets of transitions of the multiple transition burst signal.

At step 1104, the multiple transition burst signal can be output as the composite mitigation signal. In an example, the composite mitigation signal can be communicated to a dynamically matched mixing stage, for instance to at least one dynamic matching network of the dynamically matched mixing stage.

FIG. 12 is another flowchart presenting a method 1200 of generating a composite mitigation signal. At step 1202, a base signal having a frequency equal to a desired fundamental frequency of the composite mitigation signal can be generated. For example, a square wave signal can be generated. It should be noted, however, that any periodic waveform sufficient to accomplish the desired mixing product can be employed, including square waveforms, sinusoidal waveforms, triangular waveforms and periodic elliptic based waveforms.

At step 1204, a multiple transition burst signal can be generated. The multiple transition burst signal can comprise a plurality of sets of transition bursts, each set of transition bursts comprising an odd integer (N) of transitions between a first amplitude and a second amplitude of the multiple transition burst signal. N can be equal to at least three. A frequency of the multiple transition burst signal can be at least three times the desired fundamental frequency of the composite mitigation signal. Each of the sets of transition bursts can be associated with a respective plurality of transitions of the base signal between a first amplitude and a second amplitude of the base signal.

In one arrangement, a first of the odd integer (N) of transitions between the first amplitude and the second amplitude of the multiple transition burst signal can be defined to occur before the transition of the base signal with which the first of the odd integer of transitions is associated. In another arrangement, a first of the odd integer (N) of transitions between the first amplitude and the second amplitude of the multiple transition burst signal can be defined to occur when the transition of the base signal with which the first of the odd integer of transitions is associated occurs. In yet another arrangement, a first of the odd integer (N) of transitions between the first amplitude and the second amplitude of the multiple transition burst signal can be defined to occur after the transition of the base signal with which the first of the odd integer of transitions is associated.

Further, the frequency of the multiple transition burst signal can be defined to shift energy at the fundamental frequency of the base signal to at least one harmonic of the fundamental frequency.

At step 1206, the base signal and the multiple transition burst signal can be combined. At step 1208, the combination of the base signal and the multiple transition burst signal can be output as the composite mitigation signal. By way of example, the composite mitigation signal can be communicated to a dynamically matched mixing stage, for instance to at least one dynamic matching network of the dynamically matched mixing stage.

The flowcharts and block diagrams in the figures illustrate the architecture, functionality, and operation of possible implementations of systems, methods and computer program products according to various embodiments described herein. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above embodiments can be realized in hardware, software, or a combination of hardware and software. The embodiments can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein.

The embodiments also can be embedded in a computer-usable medium, such as a computer program product or other data programs storage device, readable by a machine, tangibly embodying a program of instructions executable by the machine to perform methods and processes described herein. The embodiments also can be embedded in an application product which comprises all the features enabling the implementation of the methods described herein and, which when loaded in a processing system, is able to carry out these methods.

The terms "computer program," "program code," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

The Abstract of the Disclosure is provided to allow the reader to quickly ascertain the nature of the technical disclosure. It is submitted with the understanding that it will not be used to interpret or limit the scope or meaning of the claims.

As stated above, the invention can be embodied in other forms without departing from the spirit or essential attributes thereof Accordingly, reference should be made to the following claims, rather than to the foregoing specification, as indicating the scope of the invention.

The invention claimed is:

1. A method of generating a composite mitigation signal, the method comprising:
  generating a multiple transition burst signal comprising a plurality of sets of transition bursts, each of the sets of transition bursts comprising an odd integer (N) of transitions between a first amplitude and a second amplitude of the multiple transition burst signal, N being an integer equal to at least three, and successive sets of the transition bursts being separated by a predetermined phase delay or time delay; and
  outputting the multiple transition burst signal as the composite mitigation signal.

2. The method of claim 1, wherein generating the multiple transition burst signal comprises:

defining a frequency of the multiple transition burst signal to be at least a number (K) times a fundamental frequency of the composite mitigation signal, the number (K) being a real value equal to at least three (3).

3. The method of claim 2, further comprising:
defining the frequency of the multiple transition burst signal to shift energy at the fundamental frequency to at least one harmonic of the fundamental frequency.

4. The method of claim 1, wherein generating the multiple transition burst signal comprises:
defining the predetermined phase delay or time delay to be applied between the successive sets of the transition bursts.

5. The method of claim 1, wherein outputting the multiple transition burst signal as the composite mitigation signal comprises:
communicating the composite mitigation signal to at least one dynamic matching network of a dynamically matched mixing stage.

6. A method of generating a composite mitigation signal, the method comprising:
generating a base signal having a frequency equal to a fundamental frequency of the composite mitigation signal;
generating a multiple transition burst signal comprising a plurality of sets of transition bursts, each of the sets of transition bursts comprising an odd integer (N) of transitions between a first amplitude and a second amplitude of the multiple transition burst signal, the odd integer (N) being an integer equal to at least three (3), and a frequency of the multiple transition burst signal being at least a number (K) times a fundamental frequency of the composite mitigation signal, the number (K) being a real value equal to at least three (3);
combining the base signal and the multiple transition burst signal; and
outputting the combination of the base signal and the multiple transition burst signal as the composite mitigation signal.

7. The method of claim 6, wherein generating the multiple transition burst signal comprises:
associating each of the sets of transition bursts with a respective plurality of transitions of the base signal between a first amplitude and a second amplitude of the base signal.

8. The method of claim 7, wherein generating the multiple transition burst signal further comprises:
defining a first of the odd integer (N) of transitions between the first amplitude and the second amplitude of the multiple transition burst signal to occur before the transition of the base signal with which the first of the odd integer of transitions is associated.

9. The method of claim 7, wherein generating the multiple transition burst signal further comprises:
defining a first of the odd integer (N) of transitions between the first amplitude and the second amplitude of the multiple transition burst signal to occur when the transition of the base signal with which the first of the odd integer of transitions is associated occurs.

10. The method of claim 6, wherein generating the base signal comprises:
generating a square wave signal.

11. The method of claim 6, wherein generating the multiple transition burst signal comprises:
generating a square wave signal.

12. The method of claim 6, further comprising:
defining the frequency of the multiple transition burst signal to shift energy at the fundamental frequency of the base signal to at least one harmonic of the fundamental frequency.

13. The method of claim 6, wherein outputting the combination of the base signal and the multiple transition burst signal as the composite mitigation signal comprises:
communicating the composite mitigation signal to a dynamically matched mixing stage.

14. A composite mitigation signal generator comprising:
a tap selection network that generates a multiple transition burst signal comprising a plurality of sets of transition bursts, each of the sets of transition bursts comprising an odd integer (N) of transitions between a first amplitude and a second amplitude of the multiple transition burst signal, N being an integer equal to at least three (3), and successive sets of the transition bursts being separated by a predetermined phase delay or time delay, or
a multiplexer that generates the multiple transition burst signal and in which a frequency of the multiple transition burst signal being at least a number (K) times a fundamental frequency of a composite mitigation signal, the number (K) being a real value equal to at least three (3).

15. The composite mitigation signal generator of claim 14, wherein if the composite mitigation signal generator contains the tap selection network:
the frequency of the multiple transition burst signal is at least the number (K) times the frequency of the fundamental frequency of the composite mitigation signal.

16. The composite mitigation signal generator of claim 14, wherein:
the frequency of the multiple transition burst signal is defined to shift energy at the fundamental frequency to at least one harmonic of the fundamental frequency if the composite mitigation signal generator contains the tap selection network, or
the frequency of the multiple transition burst signal is selected to shift energy at the fundamental frequency to at least one harmonic of the fundamental frequency if the composite mitigation signal generator contains the multiplexer.

17. The composite mitigation signal generator of claim 14, wherein if the composite mitigation signal generator contains the tap selection network:
the predetermined phase delay or time delay is applied between the successive sets of the transition bursts.

18. The composite mitigation signal generator of claim 14, wherein if the composite mitigation signal generator contains the multiplexer:
each of the sets of transition bursts is associated with a respective one of a plurality of transitions of a base signal between a first amplitude and a second amplitude of the base signal.

* * * * *

UNITED STATES PATENT AND TRADEMARK OFFICE
CERTIFICATE OF CORRECTION

PATENT NO. : 8,155,615 B2  Page 1 of 1
APPLICATION NO. : 12/264342
DATED : April 10, 2012
INVENTOR(S) : Ruelke et al.

It is certified that error appears in the above-identified patent and that said Letters Patent is hereby corrected as shown below:

In Fig. 12, Sheet 8 of 8, in Box "1204", in Line 11, delete "the a" and insert -- the --, therefor.

Signed and Sealed this
Twenty-fifth Day of December, 2012

David J. Kappos
*Director of the United States Patent and Trademark Office*